US010954083B2

(12) United States Patent
Adomeit et al.

(10) Patent No.: US 10,954,083 B2
(45) Date of Patent: Mar. 23, 2021

(54) CELLULAR WHEEL SLUICE FOR GRANULATE BULK PRODUCT

(71) Applicant: Coperion GmbH, Stuttgart (DE)

(72) Inventors: Holger Adomeit, Ravensburg-Durnast (DE); Michael Walter, Bad Saulgau (DE); Bruno Zinser, Waldburg (DE)

(73) Assignee: Coperion GmbH, Nuremberg (DE)

( * ) Notice: Subject to any disclaimer, the term of this patent is extended or adjusted under 35 U.S.C. 154(b) by 0 days.

(21) Appl. No.: 16/584,018

(22) Filed: Sep. 26, 2019

(65) Prior Publication Data

US 2020/0102159 A1 Apr. 2, 2020

(30) Foreign Application Priority Data

Sep. 27, 2018 (DE) .......................... 102018216654.4

(51) Int. Cl.
*B65G 53/46* (2006.01)
*B65G 65/48* (2006.01)

(52) U.S. Cl.
CPC ..... *B65G 53/4633* (2013.01); *B65G 65/4881* (2013.01); *B65G 2201/042* (2013.01)

(58) Field of Classification Search
CPC .............. B65G 53/4633; B65G 53/46; B65G 65/4881; B65G 2201/042; A01C 7/127
USPC ................................................. 222/367, 368
See application file for complete search history.

(56) References Cited

U.S. PATENT DOCUMENTS

| | | | | |
|---|---|---|---|---|
| 2,852,315 A | * | 9/1958 | Lenhart .............. | B65G 53/4641 406/67 |
| 3,052,383 A | * | 9/1962 | Transeau ........... | B65G 53/4633 222/345 |
| 3,118,575 A | | 1/1964 | McCauley | |
| 3,260,420 A | * | 7/1966 | Bentley .............. | B65G 65/4881 222/333 |
| 4,537,333 A | | 8/1985 | Bjerregaard | |
| 4,823,993 A | * | 4/1989 | Siegel ................ | B65G 53/4633 222/345 |
| 5,114,053 A | | 5/1992 | Beirle | |
| 5,129,554 A | * | 7/1992 | Futamura ........... | B65G 53/4633 222/342 |
| 5,320,258 A | * | 6/1994 | Paul ................... | B65G 53/4633 222/345 |
| 5,381,933 A | | 1/1995 | Beirle et al. | |

(Continued)

FOREIGN PATENT DOCUMENTS

| | | |
|---|---|---|
| CN | 106429249 A | 2/2017 |
| DE | 2806059 A1 | 1/1980 |

(Continued)

OTHER PUBLICATIONS

European Search Report for 19194524.5 dated Feb. 14, 2020.

*Primary Examiner* — Patrick M. Buechner
(74) *Attorney, Agent, or Firm* — Wood Herron & Evans LLP (57) ABSTRACT

A cellular wheel sluice for granulate bulk product has a housing in which a cellular wheel is rotatably mounted. The housing has an inlet duct for the bulk product. At least two raised granulate roofs are arranged at the inlet duct. A granulate groove is arranged respectively at the transition between two granulate roofs and/or at the transition between one granulate roof and an inlet edge. The two granulate grooves in each case run together at an intersection point in the rotation direction of the cellular wheel.

12 Claims, 9 Drawing Sheets

(56) References Cited

U.S. PATENT DOCUMENTS

| | | | |
|---|---|---|---|
| 8,944,295 B2 * | 2/2015 | Schneider | F16K 27/065 |
| | | | 222/368 |
| 2007/0151995 A1 * | 7/2007 | Faber | F27D 99/00 |
| | | | 222/636 |
| 2010/0237267 A1 * | 9/2010 | Chuang | B65G 53/4633 |
| | | | 251/304 |
| 2013/0146797 A1 | 6/2013 | Schneider | |

FOREIGN PATENT DOCUMENTS

| | | | | |
|---|---|---|---|---|
| DE | 3711084 A1 * | 10/1988 | | B65G 53/4633 |
| DE | 3711084 A1 | 10/1988 | | |
| DE | 4135593 A1 | 5/1993 | | |
| DE | 4228014 C1 | 8/1993 | | |
| GB | 1385332 A | 2/1975 | | |
| JP | 56259622 U | 4/1987 | | |

* cited by examiner

CELLULAR WHEEL SLUICE FOR GRANULATE BULK PRODUCT

CROSS-REFERENCE TO RELATED APPLICATIONS

This application claims the priority of German Patent Application, Serial No. DE 10 2018 216 654.4, filed on Sep. 27, 2019, pursuant to 35 U.S.C. 119(a)-(d), the content of which is incorporated herein by reference in its entirety as if fully set forth herein.

FIELD OF THE INVENTION

The invention concerns a cellular wheel sluice for granulate bulk product.

BACKGROUND OF THE INVENTION

JP S62-059622 U discloses a cellular wheel sluice with a granulate roof arranged on the housing at the inlet duct, wherein a granulate groove is provided at the transition between a granulate roof and the inlet duct. The granulate groove reduces the risk that a granulate grain of the bulk product will fall into the already largely filled chamber of the cellular wheel and be torn and/or cut between the housing edge and the rotor blade. Nonetheless, chopping, i.e. destruction of the granulate grain, can occur at the groove outlet where the groove ends. The groove outlet is known as the intersection point.

SUMMARY OF THE INVENTION

It is an object of the present invention to create a cellular wheel sluice with improved inlet behaviour for the granulate bulk product, wherein in particular, damage to the bulk product is reduced.

According to the invention, this object is achieved by a cellular wheel sluice for granulate bulk product, with a housing in which a cellular wheel is rotatably mounted, wherein the housing has an inlet duct for the bulk product, wherein at least two raised granulate roofs are arranged at the inlet duct, wherein a granulate groove is arranged respectively at the transition between two granulate roofs and/or at the transition between one granulate roof and an inlet edge, wherein two granulate grooves in each case run together at an intersection point in the rotation direction of the cellular wheel.

According to the invention, it has been found that the inlet behaviour for bulk product into a cellular wheel sluice can be improved if a surface area at the inlet duct is enlarged. According to the invention, at least two raised granulate roofs are arranged at the inlet duct. The respective granulate roof in particular is configured as a nose.

Viewed from above into the inlet duct, the granulate roof is triangular. The granulate roof improves the inlet behaviour of granulate bulk product. To reduce damage to the bulk product, two granulate grooves, arranged at the respective transition between two granulate roofs and/or at the transition between one granulate roof and an inlet edge, run together at an intersection point. The inlet edges are the edges at the inlet duct over which the granulate grains are supplied from the inlet duct into the cylinder bore of the housing of the cellular wheel sluice. The inlet edge is arranged in particular at the transition to the inlet duct. The granulate bulk product can enter the chamber of the cellular wheel via the inlet edge. This achieves that, despite the increase in surface area in the inlet duct, the number of intersection points does not rise linearly. According to the invention, the ratio of surface area at the inlet duct to the number of intersection points is increased, in particular disproportionately. A cellular wheel sluice with three granulate roofs in particular has only two intersection points.

With the cellular wheel sluice according to the invention, the throughput rate is increased and the cutting or chopping behaviour reduced. One essential finding is that a surface area of a large granulate roof can be divided into several comparatively smaller granulate roofs. For example, two granulate roofs, three granulate roofs, four granulate roofs or five granulate roofs or more may be provided. The granulate roofs are arranged next to each other over a width of the inlet duct. The width of the inlet duct is oriented parallel to the rotation axis of the cellular wheel. In particular, the enlarged surface area at the inlet duct is between 110% and 150% of the surface area of a cellular wheel sluice of the similar design with just one granulate roof, in particular between 120% and 140%, and in particular between 125% and 135%. The sluice according to the invention may be filled reliably and faultlessly even at high rotation speeds, in particular at peripheral rotor speeds of at least 1 m/s and in particular at least 2 m/s. The fill level of the individual chambers of the cellular wheel is improved. The mass throughput of the cellular wheel sluice is increased.

The housing of the cellular wheel sluice has a cylinder bore which is also known as the interior of the cellular wheel sluice.

A cellular wheel sluice, wherein a displacement angle enclosed between the granulate groove and a cellular wheel web is constant at least in portions irrespective of the rotary position of the cellular wheel, allows a constant displacement behaviour of the cellular wheel. It has been found that the displacement angle, which in particular depends on the rotary position of the cellular wheel in the housing of the cellular wheel sluice, is a relevant parameter for the displacement behaviour of the granulate grain in the granulate groove. It has been found that a constant displacement behaviour is achieved if the displacement angle is constant at least in portions. In particular, the displacement angle is constant over at least 50% of the total length of the granulate groove, in particular over 60% of the total length of the granulate groove, in particular over 70% of the total length of the granulate groove, in particular over 80% of the total length of the granulate groove, in particular over 90% of the total length of the granulate groove, in particular over 95% of the total length of the granulate groove, and in particular along the entire length of the granulate groove. This allows a reduction in the housing angle necessary for the granulate groove, in order in particular to enlarge the inlet cross-section of the cellular wheel sluice. Such a sluice has an increased throughput capacity.

In addition or alternatively, in a cellular wheel sluice, the displacement angle enclosed between the granulate groove and a cellular wheel web may increase at least in portions in the rotation direction of the cellular wheel. The increase may for example be linear or progressive. The increase may also be continuous along the entire granulate groove length. For example, the displacement angle at the start of the granulate groove may be at least 35°, and at the end of the granulate groove, in particular at the intersection point, at most 70°. Because of the curved surface on the inside of the cylinder bore, such a granulate groove may appear, in a projection in the horizontal plane, as if the displacement angle were constant. In fact, the displacement angle is designed to increase in portions in the rotation direction of the cellular wheel.

A cellular wheel sluice, wherein the displacement angle (α): 30°≤α≤90°, in particular 30°≤α≤80°, in particular 30°≤α≤70°, in particular 30°≤α≤60°, in particular 35°≤α≤50° and in particular 40°≤α≤45°, has an improved conveying behaviour. Chopping of the granulate grains is substantially prevented.

A granulate groove having a constant cross-sectional area along the groove course, allows advantageous displacement of the bulk product along the granulate groove. The cross-sectional shape of the granulate groove may be selected substantially arbitrarily. The cross-sectional shape may be square, rectangular or triangular, in particular with rounded tips. However other, in particular rounded, cross-sectional areas for the granulate groove are also conceivable.

The design of a granulate groove having an opening angle (β) oriented relative to an interior of the housing, wherein 80°≤β≤120°, in particular 90°≤β≤110°, improves the displacement behaviour for the granulate grain in the cellular wheel sluice. It has been found that a sharp-edged design of the granulate groove, viewed from the interior of the cellular wheel sluice, should be avoided.

A granulate groove having a demoulding chamfer facing the interior of the housing, allows an advantageous production of the housing. In particular, a core part may be omitted on casting of the housing.

In a cellular wheel sluice, wherein deflection edges of the granulate roofs have the same lengths and in particular are evenly distributed in a transverse direction which is oriented in particular parallel to the rotation axis of the cellular wheel, the risk of damaging the granulate grain is further reduced. The integral length of all granulate grooves is increased so that sliding of the granulate grains along the granulate groove to the intersection point can be avoided.

Alternatively, a design of a cellular wheel sluice, wherein a lateral distance of deflection edges of the granulate roofs from the side inlet edge is greater than the length of the deflection edges, allows an increased throughput capacity. The inlet face of the cellular wheel sluice is comparatively large and allows an increased mass flow of bulk product into the cellular wheel sluice through the inlet duct.

A cellular wheel sluice, wherein the granulate roof is tilted continuously relative to a vertical plane, wherein the granulate roof in particular extends up to the cylinder bore of the housing, allows an improved discharge effect on the granulate bulk product falling into the inlet duct. The probability of a granulate grain slipping between the nose tip, i.e. the front end of the granulate roof, and the cell wheel web is reduced. The risk of chopping of the bulk product at this site is reduced.

Exemplary embodiments of the invention are explained in more detail below with reference to the drawing.

DESCRIPTION OF THE PREFERRED EMBODIMENTS

A cellular wheel sluice shown in FIGS. 1 to 8 and designated as a whole as 1 serves for metered delivery of granulate bulk product, in particular plastic granulate.

The cellular wheel sluice 1 comprises a housing 2 with a cylindrical bore 3 in which a cellular wheel 4 is arranged coaxially so that it can be driven in rotation about a rotation axis 5. The cylinder bore 3 forms the interior of the housing 2.

The cellular wheel 4 has a cellular wheel shaft 6 and several cellular wheel webs 7 which are arranged on the cellular wheel shaft 6 and oriented radially relative to the rotation axis 5. The cellular wheel webs 7 are arranged around the rotation axis 5 and equally spaced apart from each other in the rotation direction 8. A cellular wheel chamber 10, into which the granulate bulk product is metered for delivery, is delimited between the cellular wheel shaft 6, two adjacent cellular wheel webs 7, and an inner casing surface 9 of the cylinder bore 3.

According to the exemplary embodiment shown, the cellular wheel 4 has twelve cellular wheel webs 7, so that twelve cellular wheel chambers 10 are formed. The number of cellular wheel webs 7 may be greater or smaller depending on the application of the cellular wheel 4, in order to set a finer or coarser distribution of the cellular wheel chambers 10.

On the end faces along the rotation axis 5, the housing 2 may be closed tightly by a respective side cover (not shown). For this, the housing 2 has a connecting flange 12 arranged on each end face and integrated in the housing 2. Several fixing bores (not shown) are provided at the connecting or side flange 12, so that the housing cover can be mounted releasably and tightly on the side flange 12 by means of fixing screws. For this, a seal, in particular an O-ring or a flat seal, may be arranged between the side flange 12 and the side cover.

Figure 4:
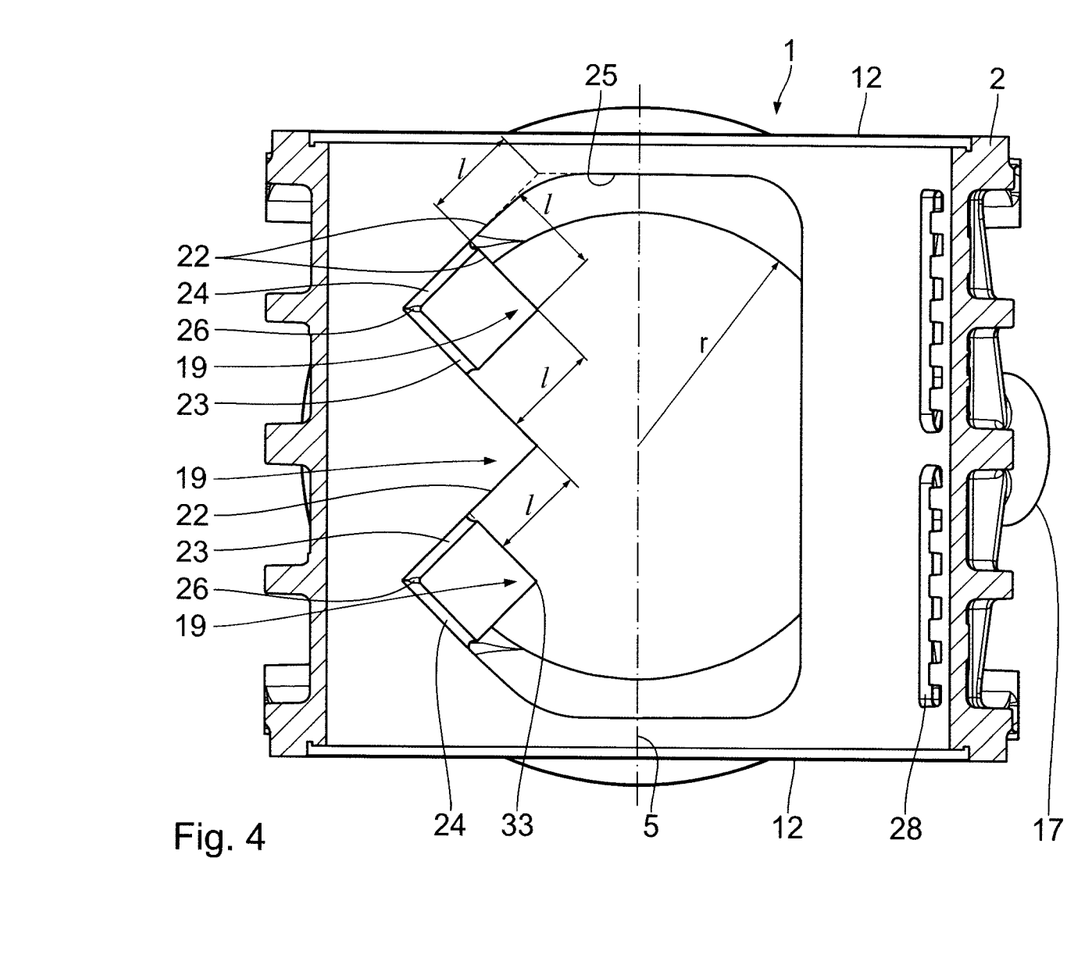
FIG. 4 shows a sectional depiction along section line IV-IV in FIG. 2.
Figure 5:
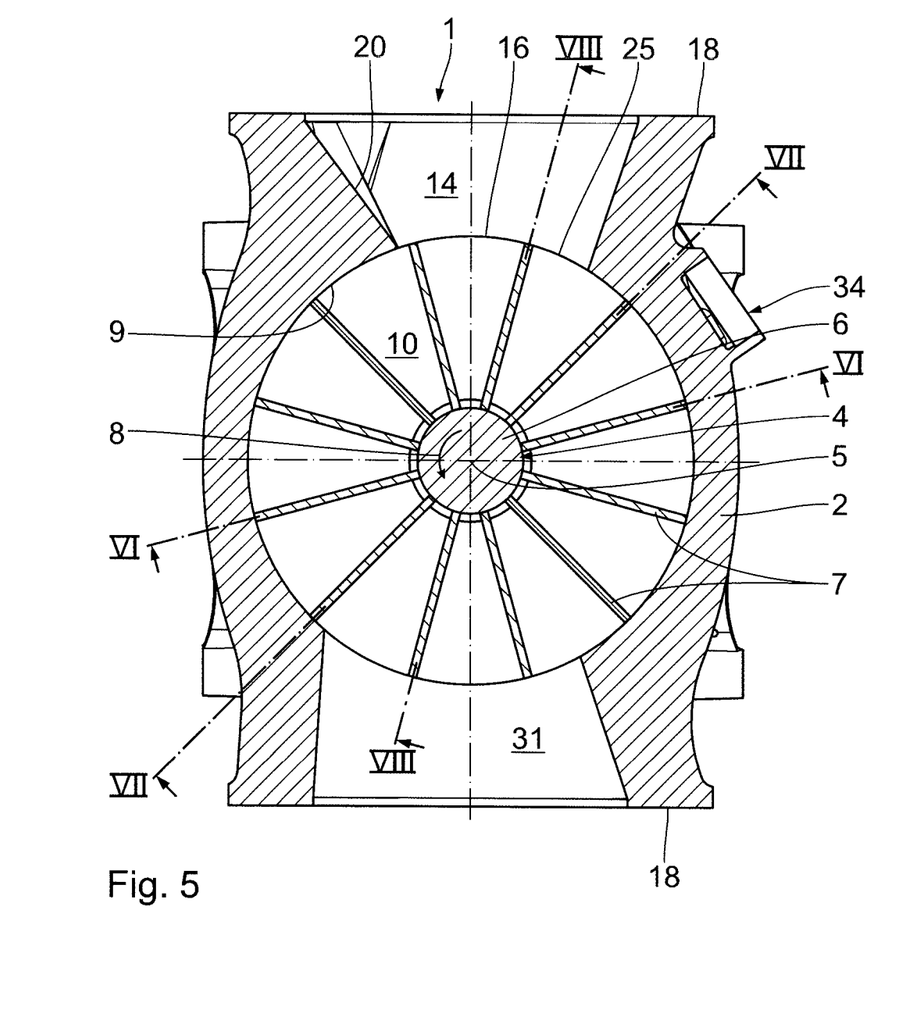
FIG. 5 shows a side view of a cellular wheel sluice according to a further embodiment, with various view planes marked.

On the outside of the housing 2, a leakage air connector 17 is arranged which is connected via a leakage air channel 28 to the cylinder bore 3. The leakage air channel 28 may in regions have two strands running parallel to each other, as shown in FIG. 4. The leakage air channel 28 may, additionally or alternatively, have fittings (not shown) for sound reduction.

The housing 2 comprises an inlet duct 14 via which the bulk product is supplied to the cellular wheel sluice 1, in particular the cylinder bore 3, with the cellular wheel 4. In the installation position of the cellular wheel sluice 1 shown in FIGS. 2 and 7, the inlet duct 14 is arranged at the top so that the bulk product supplied is conveyed automatically under gravity into the cylinder bore 3. The inlet duct 14 has an inlet chamfer 15, along which the granulate bulk product flows into the cylinder bore 3. The inlet duct 14 is connected to the cylinder bore 3 via an inlet opening 16. The inlet surface 16 has a width B oriented parallel to the rotation axis 5. In a projection of the inlet opening 16 in a horizontal plane according to FIG. 1, the inlet opening 16 has a length L oriented perpendicularly to the width B.

At its upper end, the inlet duct 14 has a connecting flange 18 which is designed correspondingly to the connecting flanges 12 arranged on the end faces. According to the exemplary embodiment shown, sixteen fixing bores 13 are arranged at the connecting flange 18 of the inlet duct 14.

Three nose-like granulate roofs 19 are arranged at the inlet duct 14, in particular along the inlet chamfer 15. The granulate roofs 19 are designed raised relative to the inlet chamfer 15. The granulate roofs 19 create an enlargement of the surface area of the inlet chamfer 15 in the inlet duct 14. The granulate roofs 19 are arranged in the manner of an equilateral saddle roof at the inlet chamfer 15. The granulate roofs 19 extend like dormers away from the inlet chamfer 15. Each granulate roof 19 has a ridge 20 and two longitudinal faces 21 which are arranged tilted by a slope angle $\eta$ relative to a vertical plane, oriented in particular perpendicularly to the rotation axis 5. The free edges of the longitudinal faces 21 which are arranged facing away from the inlet chamfer 15 are described as deflection edges 22. The deflection edge 22 is also called the inlet edge.

Figure 1:
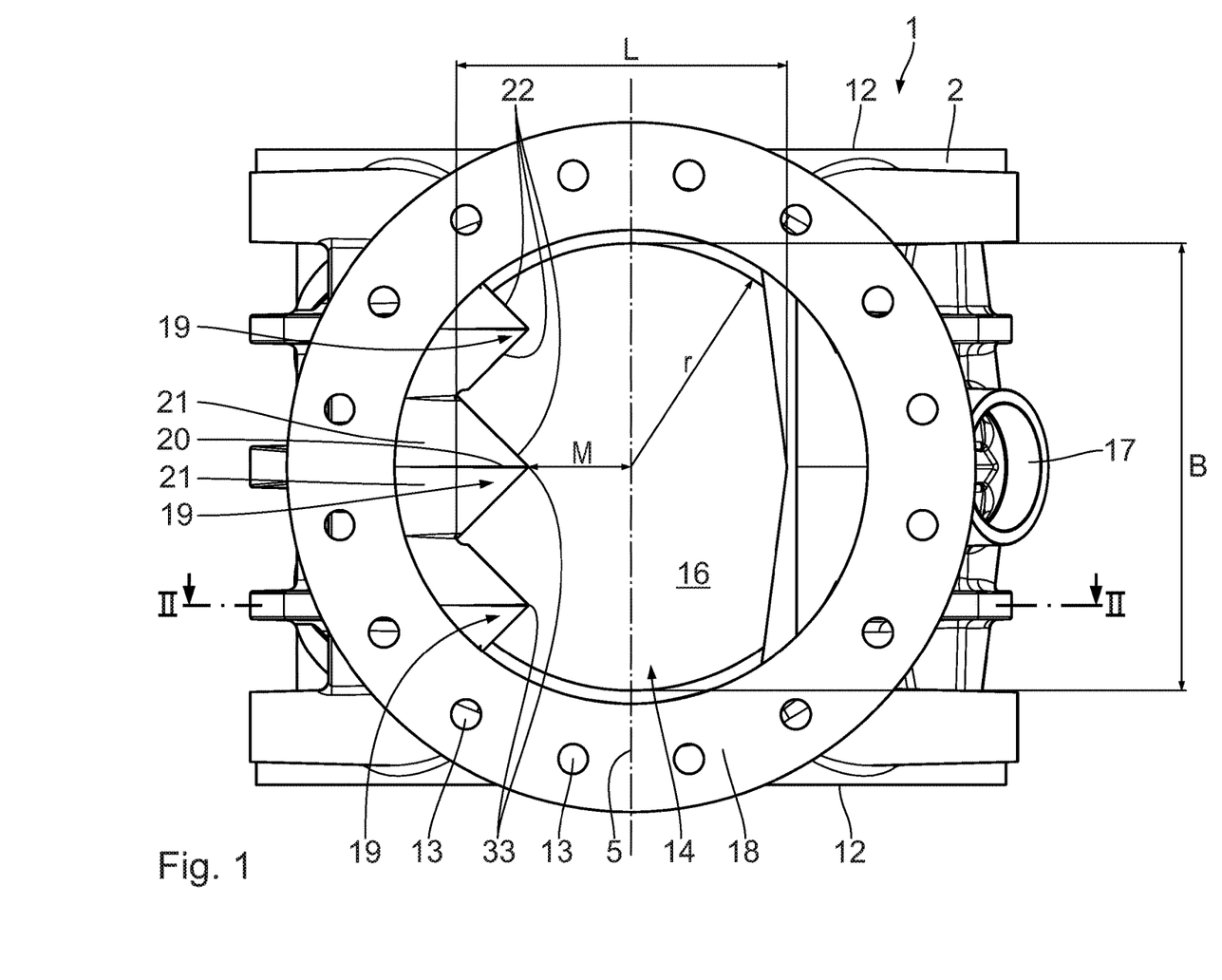
FIG. 1 shows a top view of a sluice according to the invention without cellular wheel, looking into the inlet duct.
Figure 2:
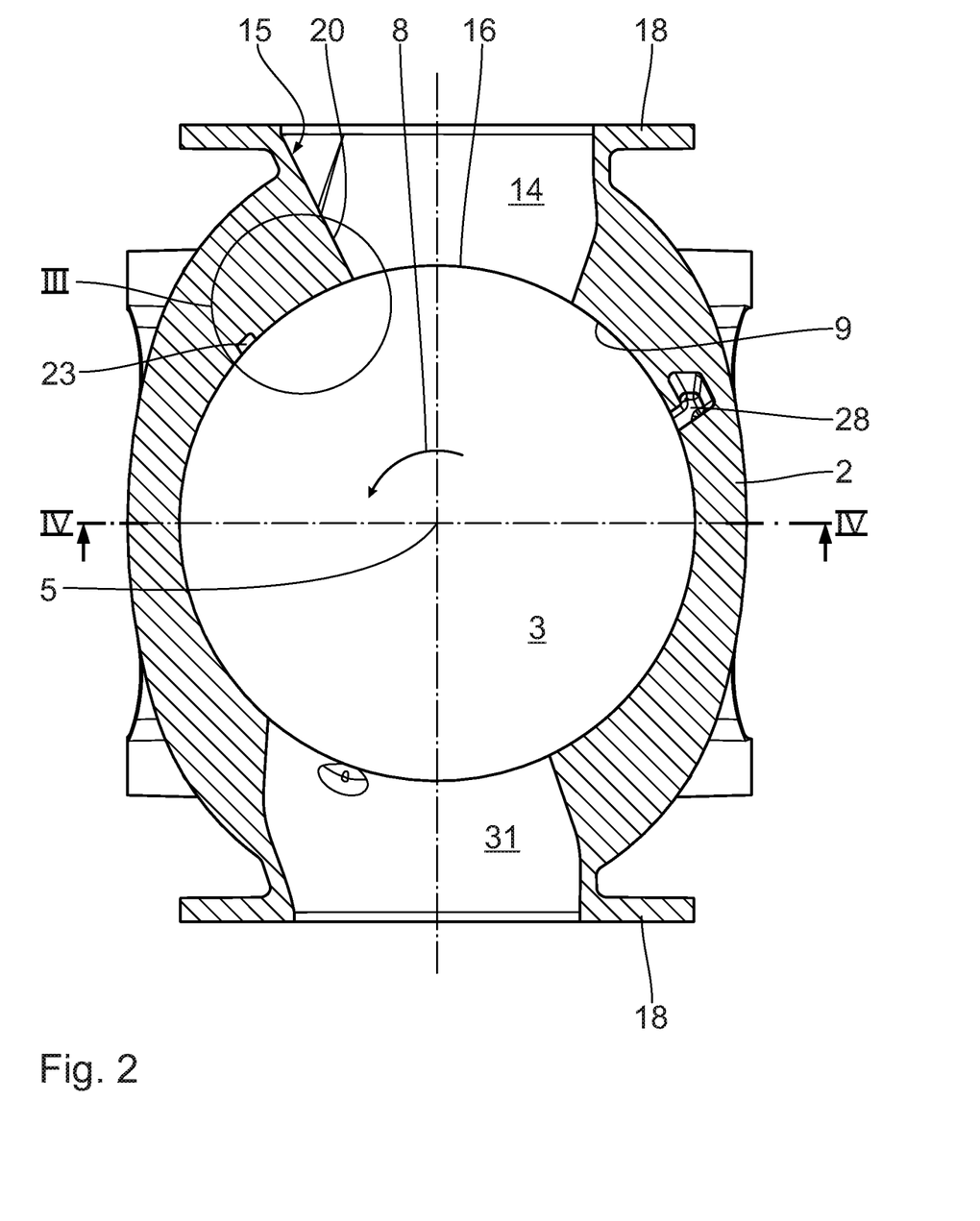
FIG. 2 shows a sectional depiction along section line II-II in FIG. 1.
Figure 3:
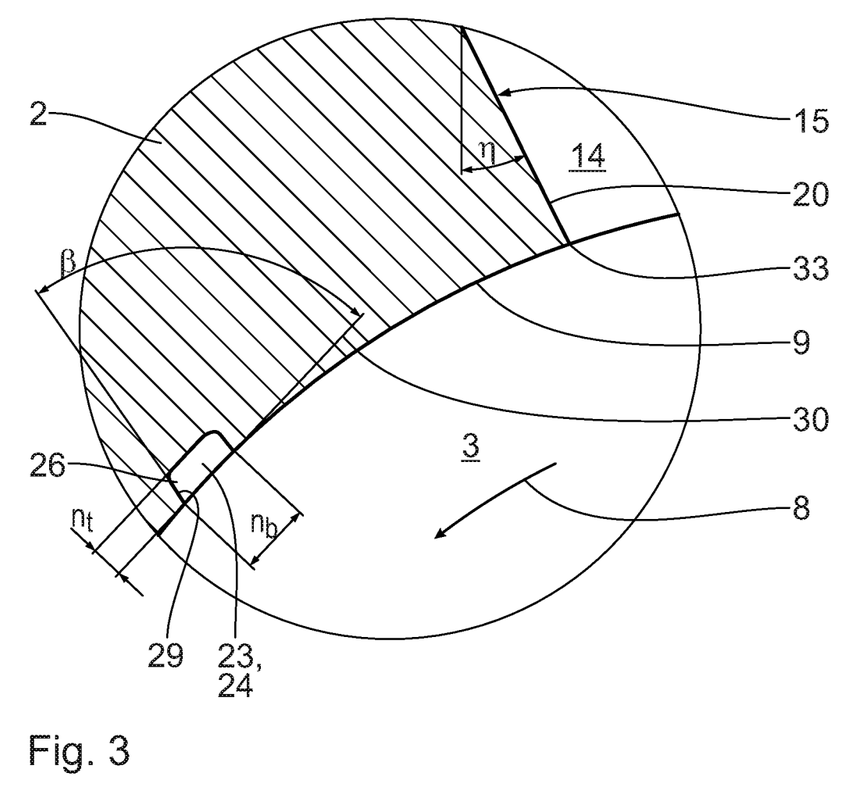
FIG. 3 shows an enlarged depiction of detail III in FIG. 2.

The granulate roofs 19 extend at the inlet chamfer 15 in the inlet duct 14 up to the cellular wheel bore 3, as shown in particular in FIG. 2 and in detail in FIG. 3. The granulate roofs 19 each have the ridge 20 as the front edge, which runs into a lower front tip 33. The tip 33 faces the cylinder bore 3 and constitutes the transition between the inlet chamfer 15 with the granulate roof 19 to the cylinder bore 3.

The granulate roofs 19 are arranged next to each other in the width direction, i.e. in a direction parallel to the rotation axis 5. The granulate roofs 19 are arranged at the inlet chamfer 15 such that the respective ridge 20 is oriented transversely and in particular perpendicular to the rotation axis 5.

A first granulate groove 23 is formed in a respective transitional region between two adjacent granulate roofs 19. The first granulate groove 23 is in particular arranged as a groove-like depression at a virtual abutment edge of the respective longitudinal faces 21 of adjacent granulate roofs 19. At a respective outside of the outermost granulate roofs 19, i.e. in a transitional region between the outermost granulate roofs 19 and an inner delimiting wall of the inlet duct 14, a second granulate groove 24 is arranged which is designed substantially identically to the first granulate groove 23. The delimiting wall has an upper delimiting edge 25 facing the inlet duct 14. The delimiting edge 25 forms an inlet edge.

The granulate grooves 23, 24 are each designed as a groove-like depression in the casing surface 9 of the cylinder bore 3. The granulate grooves 23, 24 extend in the rotation direction 8 of the cellular wheel 4. Two granulate grooves 23, 24 in each case run together at an intersection point 26. The intersection point 26 should not be regarded as a point in the geometric sense. It is the connecting site between two grooves, in particular a connecting region, for example a sectional plane and/or an edge, as shown in particular in FIG. 4.

Because the granulate grooves 23, 24 run together in pairs at an intersection point 26, the number of intersection points, namely two, is reduced in particular relative to the total number of granulate roofs 19, namely three. The cellular wheel sluice 1 optimises the number of granulate roofs 19 relative to that of intersection points 26.

According to the exemplary embodiment shown, in the region of the inlet duct, the surface area is enlarged by the granulate roofs 19 by at least 20%, in particular by at least 25% and in particular at least 30% in comparison with a comparable cellular wheel sluice with just one granulate roof.

According to the exemplary embodiment shown, all granulate roofs 19 are configured identically. The deflection edges 22 of a granulate roof 19 each have the same lengths l. The deflection edges 22 of the different granulate roofs 19 also have the same lengths l. In particular, the granulate roofs 19 are evenly distributed along the rotation axis 5. This means that the deflection edges 22, which are arranged from the inlet duct 14 to the respective granulate roofs 19 arranged on the outside, have the same length l as the lengths of the deflection edges 22 of the actual granulate roofs 19. The granulate roofs 19 are evenly distributed along the rotation axis 5. With this design, the granulate roofs 19 are designed comparatively larger, i.e. have a larger roof area. Accordingly, the granulate grooves 23, 24 are designed comparatively longer, so that the chopping behaviour of the cellular wheel sluice 1 is further improved. The risk of granulate grains being crushed or cut on entry into the cellular wheel sluice 1, in particular into the cylinder bore 3, is reduced.

The sectional depiction according to FIG. 3 shows the intersection point 26 with two granulate grooves 23, 24 running together. In this depiction, the cross-sectional area of the granulate groove 23, 24 can be seen. The cross-sectional shape of the granulate groove 23, 24 is substantially rectangular, with a groove depth $n_t$ and a groove width $n_b$. According to the exemplary embodiment shown, the groove width $n_b$ is greater than the groove depth $n_t$, in particular $n_b \geq 1.2 \cdot n_t$, in particular $n_b \geq 1.5 \cdot n_t$. The cross-sectional area of the granulate groove 23, 24 is in particular dimensioned such that a granulate grain of mean granulate size lies contactlessly, i.e. without having to bear on the side faces of the granulate groove 23, 24 or on a cellular wheel web 7 which passes by the opening of the granulate groove 23, 24.

In particular, the minimum clear width of the granulate groove 23, 24, which, according to the exemplary embodiment shown, corresponds to the Groove depth $n_t$, is greater than the largest particle diameter of the granulate grains. This guarantees free transport of the granulate grains along the granulate groove 23, 24.

According to the exemplary embodiment shown, the granulate groove 23, 24 has a constant cross-sectional area along the groove course.

The granulate groove 23, 24 is arranged, in particular at the intersection point 26, with an opening angle $\beta$ relative to the cylinder bore 3 of the housing 2, wherein the opening angle is less than or equal to 120°. It is advantageous if the opening angle is between 80° and 120°, in particular between 90° and 110°.

The opening angle $\beta$ is defined by the side edge 29 of the granulate groove 23, 24 at the rear in the rotation direction 8, and by the tangent 30 at the casing surface of the cylinder bore 3 at the intersection point with the rear side edge 29.

On the underside of the housing 2, the cellular wheel sluice 1 has an outlet duct 31. The inlet duct 14 and the outlet duct 31 are arranged opposite each other relative to the rotation axis 5. Via the outlet duct 31, the bulk product conveyed and metered by means of the cellular wheel 4 can be output from the cellular wheel sluice 1. On the end face at the bottom at the outlet duct 31, the housing 2 has a further connecting flange 18 for connection of the cellular wheel sluice 1 to delivery components and/or lines, which flange is designed substantially identically to the connecting flange 18 at the inlet duct 14.

Figure 6:
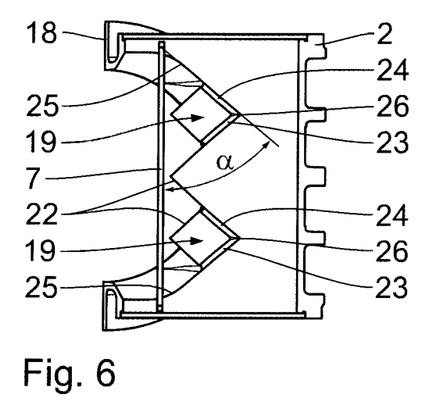
FIG. 6 shows a depiction of the housing interior of the cellular wheel sluice according to FIG. 5, according to view VI-VI.
Figure 7:
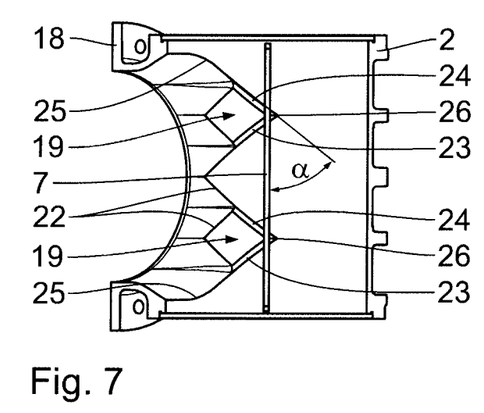
FIG. 7 shows a depiction corresponding to FIG. 6, according to view VII-VII in FIG. 5.
Figure 8:
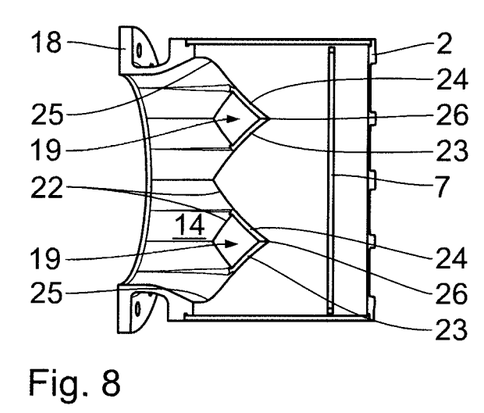
FIG. 8 shows a depiction corresponding to FIG. 6, according to view VIII-VIII in FIG. 5.

With reference to FIGS. 5 to 8, a displacement angle α and its function are now explained in more detail. FIGS. 6 to 8 each show a view from the centre, i.e. from the rotation axis 5, of the cylinder bore 3 onto an underside of the inlet chamfer 15 with the granulate roofs 19. The drawings also each show a cellular wheel web 7. The essential feature of the depictions in FIGS. 6 to 8 is that the view is not vertical, but is a view in the radial direction relative to the rotation axis 5. The depictions in FIGS. 6 to 8 thus take into account the respective rotary position of the cellular wheel 4 or cellular wheel web 7 relative to the granulate grooves 23, 24. The displacement angle α is enclosed between the granulate groove 23, 24 and the cellular wheel web 7.

It has been found that it is advantageous if the displacement angle α is greater than or equal to 30°. It is particularly advantageous if the displacement angle α is greater than or equal to 30° irrespective of the rotary position of the cellular wheel 4. According to the exemplary embodiment shown, the displacement angle α is 45° irrespective of the rotary position of the cellular wheel. The displacement angle α may also be greater than or less than 45°.

In particular, it has been found that it is not necessary for the displacement angle α to have a constant course in a top view onto the granulate groove 23, 24 and/or the deflection edge 22. In particular, the displacement angle α may increase continuously in the granulate groove 23, 24 up to the intersection point 26.

In particular, the displacement angle α is similar and in particular identical for all deflection edges 22. A similar displacement angle α means that angular deviations between different displacement angles α do not exceed 5°, in particular 3° and in particular 1°. This means that, in the inlet duct 14, all deflection edges 22 are defined similarly, in particular identically. The displacement edges 22 in particular run in the rotation direction 8 of the cellular wheel 4.

It is therefore possible to reduce the displacement angle α in the cellular wheel sluice 1 shown. By reducing the displacement angle α, in particular to less than 45°, the inlet opening is enlarged. In this way, the cellular wheel sluice 1 may be operated with an increased throughput, i.e. with higher capacity.

A centre distance M of the front tips 33 of the inlet chamfers 15 from the rotation axis 5 is comparatively large, according to this exemplary embodiment, in relation to a cellular wheel sluice known from U.S. Pat. No. 5,129,554 with just one granulate roof. The centre distance M is smaller than a radius r of the circular bore of the inlet duct 14 or outlet duct 31. In particular: M<r, in particular M<0.8·r, in particular M<0.6·r, and in particular M<0.5·r.

Figure 9:
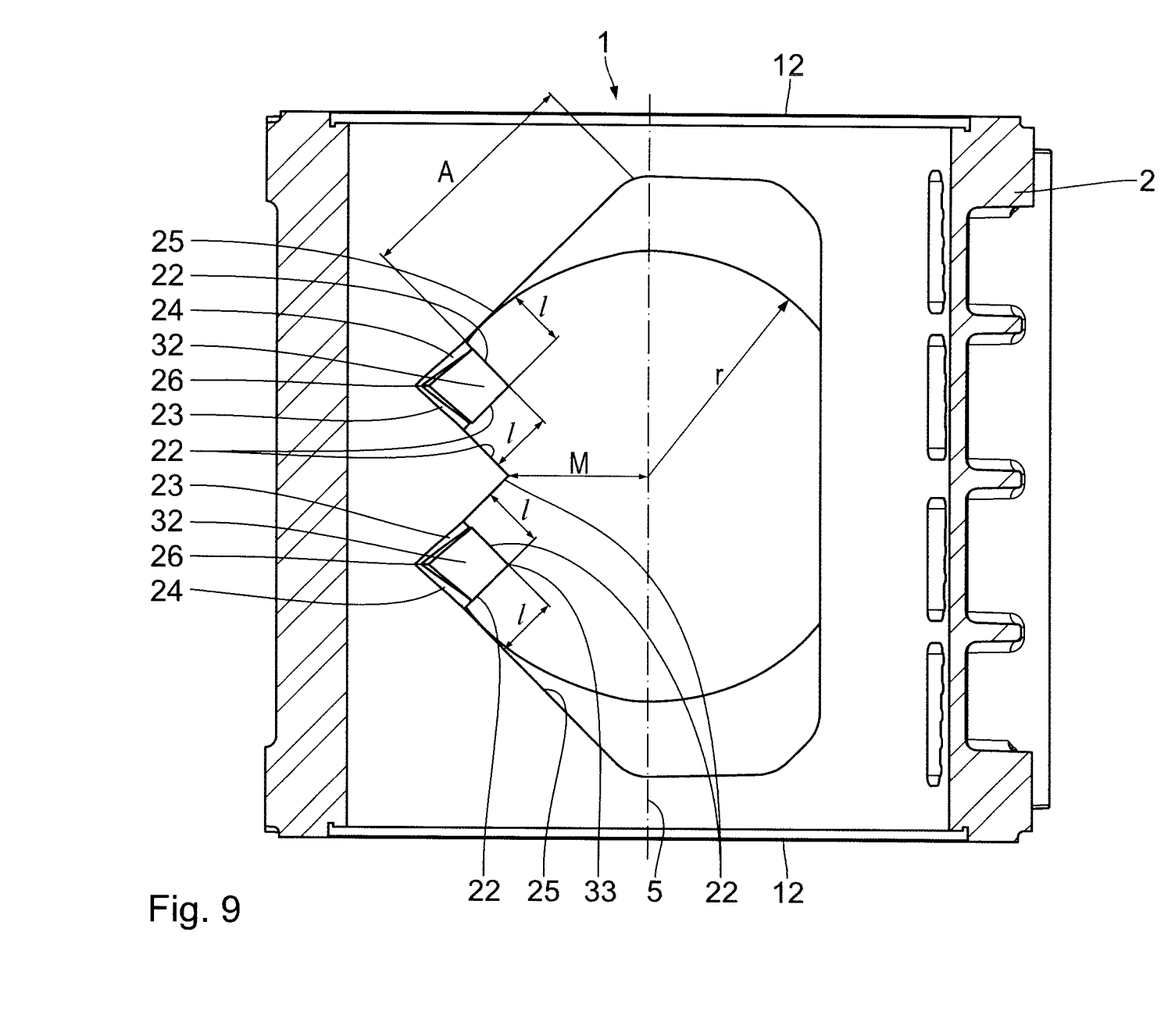
FIG. 9 shows a view corresponding to FIG. 4 of a cellular wheel sluice according to a further embodiment.

FIG. 9 shows a further embodiment of a cellular wheel sluice 1. Components which correspond to those already explained above with reference to FIGS. 1 to 8 carry the same reference signs and are not discussed again in detail.

In the cellular wheel sluice 1, the granulate roofs 32 are designed comparatively smaller. This means that the length l of the deflection edges 22 of the granulate roofs 32 is smaller than in the previous exemplary embodiment. Also, a lateral distance A of the deflection edges 22 of the granulate roofs 32 from the side inlet edge 25 is greater than the respective length l of the deflection edges 22. In particular: A≥1.5·l, in particular A≥2·l and in particular A≥2.5·l.

In the exemplary embodiment shown, the centre distance M of the front tips 33 from the rotation axis 5 is at least 0.45·r. In particular: M>0.48·r, in particular M≥0.5·r and in particular M≥0.525·r.

In this embodiment, the inlet opening 16 is cleared to a larger proportion. This means that the free through-flow area of the inlet opening 16 in this exemplary embodiment is larger. The conduction capacity of this cellular wheel sluice is increased.

Figure 10:
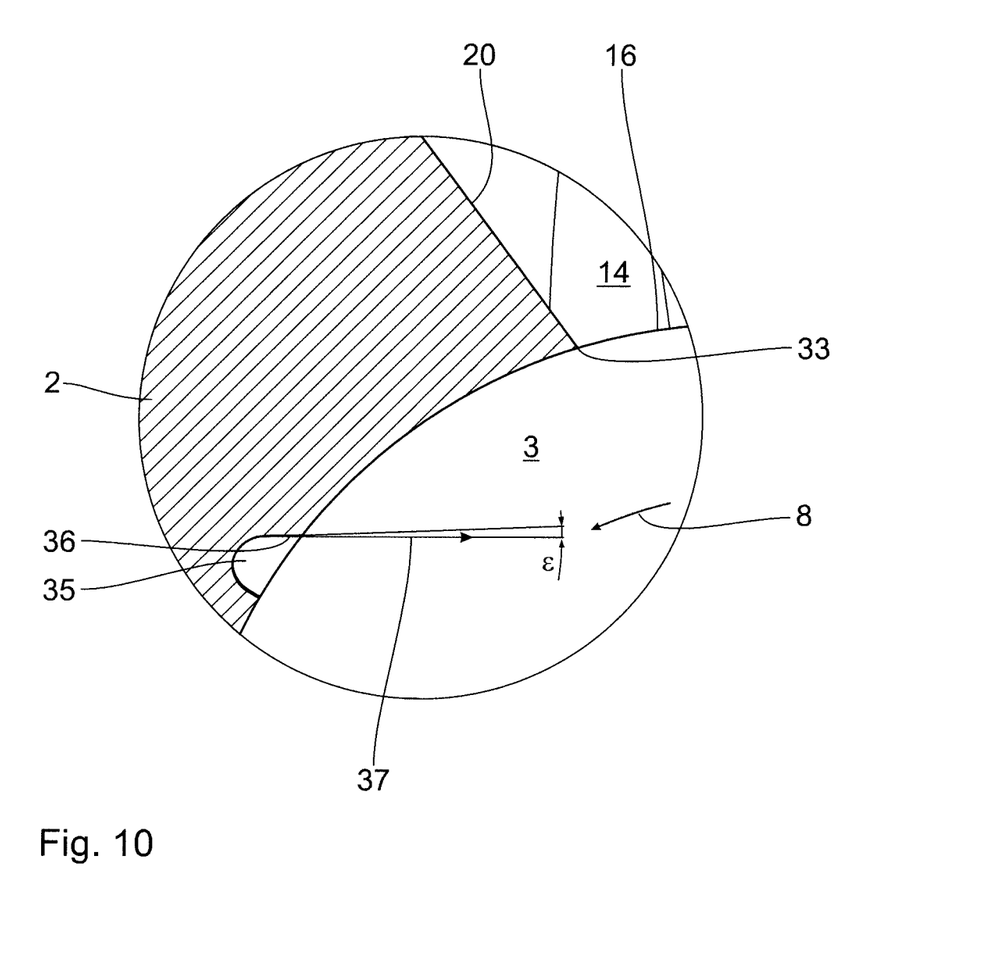
FIG. 10 shows a depiction corresponding to FIG. 3 of a granulate groove of a cellular wheel sluice according to a further exemplary embodiment.

According to the exemplary embodiment shown in FIG. 10, the granulate groove 35 has a substantially rounded contour. Also, the granulate groove 35 has a demoulding chamfer c with which the upper groove edge 36, at the front of the rotation direction 8, is additionally opened towards the cylinder bore 3. The demoulding chamfer, according to the exemplary embodiment shown, is approximately 1°. By designing the granulate groove 35 with the demoulding chamfer e, the housing 2 can be removed directly from the mould in the demoulding direction 37 during production by casting. In this way, a further core part for the casting process may be omitted. Casting production of the housing 2 with the granulate groove 35 with the demoulding chamfer ε is simplified. In particular, the demoulding chamfer c is the angle formed between the front edge 36 of the granulate groove 35 and the demoulding direction 37.

Figure 11:
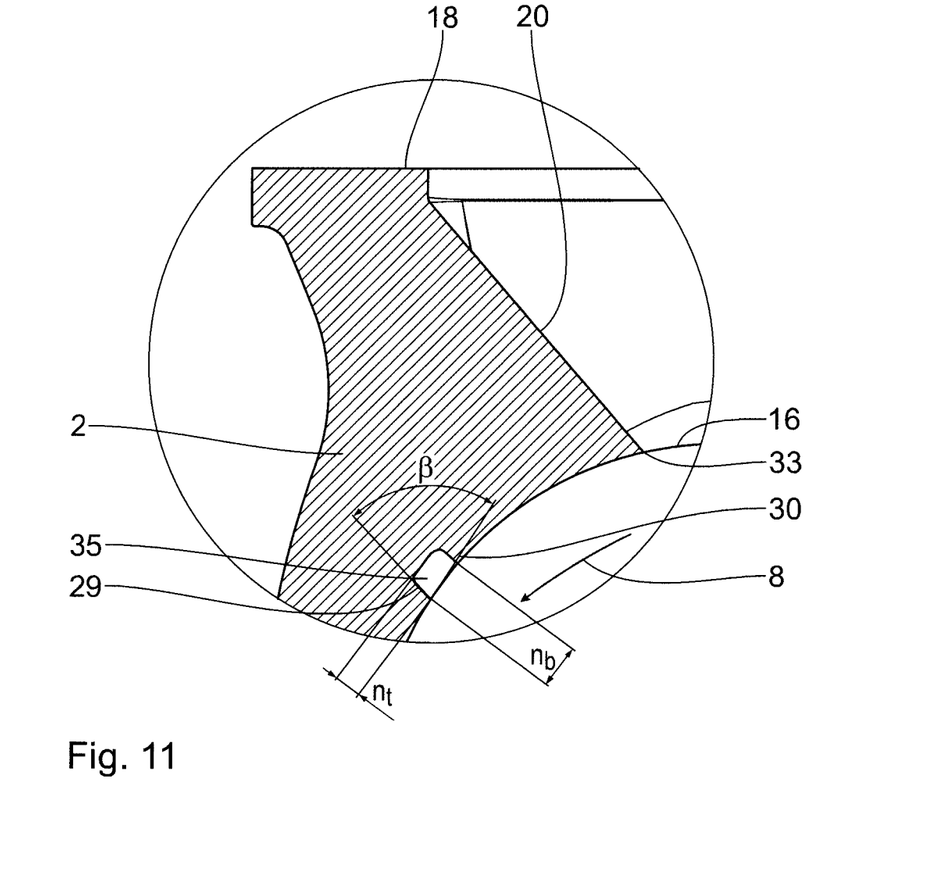
FIG. 11 shows a detail view corresponding to FIG. 10 of a granulate groove of the cellular wheel sluice according to a further embodiment.

FIG. 11 shows a further embodiment of the granulate groove 35 which corresponds substantially to the embodiment in FIG. 3, wherein the groove depth $n_t$ is enlarged so that the granulate groove 35 has approximately a square cross-sectional area.

The opening angle β is selected correspondingly to the exemplary embodiment in FIG. 3.

What is claimed is:

1. A cellular wheel sluice for granulate bulk product, with a housing in which a cellular wheel is rotatably mounted, wherein the housing has an inlet duct for the bulk product, wherein at least two raised granulate roofs are arranged at the inlet duct, wherein a granulate groove is arranged respectively at least one of at the transition between two granulate roofs and at the transition between one granulate roof and an inlet edge, wherein two granulate grooves in each case run together at an intersection point in the rotation direction of the cellular wheel.

2. The cellular wheel sluice according to claim 1, wherein a displacement angle α enclosed between one of the granulate grooves and a cellular wheel web is constant at least in portions irrespective of the rotary position of the cellular wheel.

3. The cellular wheel sluice according to claim 1, wherein a displacement angle α enclosed between one of the granulate grooves and a cellular wheel web increases at least in portions in the rotation direction of the cellular wheel.

4. The cellular wheel sluice according to claim 3, wherein for the displacement angle α: 30°≤α≤90°.

5. The cellular wheel sluice according to claim 1, wherein each granulate groove has a constant cross-sectional area along the groove course.

6. The cellular wheel sluice according to claim 1, wherein each granulate groove has an opening angle β oriented relative to an interior of the housing, wherein 80°≤β≤120°.

7. The cellular wheel sluice according to claim 1, wherein each granulate groove has a demoulding chamfer ε facing an interior of the housing.

8. The cellular wheel sluice according to claim 1, wherein deflection edges of the granulate roofs have the same lengths l.

9. The cellular wheel sluice according to claim 8, wherein deflection edges of the granulate roofs are evenly distributed in a transverse direction which is oriented parallel to the rotation axis of the cellular wheel.

10. The cellular wheel sluice according to claim 1, wherein a lateral distance A of deflection edges of the granulate roofs from the inlet edge is greater than the length l of the deflection edges.

11. The cellular wheel sluice according to claim 1, wherein each granulate roof is tilted continuously relative to a vertical plane.

12. The cellular wheel sluice according to claim 11, wherein each granulate roof extends up to a cylinder bore of the housing.

* * * * *